(12) United States Patent
Meijer et al.

(10) Patent No.: US 7,676,476 B2
(45) Date of Patent: Mar. 9, 2010

(54) DATA TYPES WITH INCORPORATED COLLATION INFORMATION

(75) Inventors: Henricus Johannes Maria Meijer, Mercer Island, WA (US); Yan V. Leshinsky, Bellevue, WA (US); Arpan A. Desai, Bothell, WA (US); Andrew E. Kimball, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 10/925,509

(22) Filed: Aug. 25, 2004

(65) Prior Publication Data

US 2006/0047671 A1    Mar. 2, 2006

(51) Int. Cl.
*G06F 17/00* (2006.01)
(52) U.S. Cl. .................. 707/100; 707/7; 707/3
(58) Field of Classification Search .......... 717/154; 707/3, 7, 100
See application file for complete search history.

(56) References Cited

U.S. PATENT DOCUMENTS

| | | | |
|---|---|---|---|
| 5,488,727 A | | 1/1996 | Agrawal et al. |
| 5,675,818 A | * | 10/1997 | Kennedy ..................... 704/8 |
| 5,696,973 A | * | 12/1997 | Agrawal et al. ............ 717/154 |
| 5,907,326 A | * | 5/1999 | Atkin et al. ................. 715/866 |
| 5,983,020 A | | 11/1999 | Sweeney et al. |
| 6,014,518 A | | 1/2000 | Steensgaard |
| 6,085,194 A | * | 7/2000 | Ige et al. ..................... 707/10 |
| 6,230,314 B1 | | 5/2001 | Sweeney et al. |
| 2002/0174100 A1 | * | 11/2002 | Daray et al. ................ 707/1 |
| 2002/0184251 A1 | * | 12/2002 | Ho et al. .................... 707/205 |
| 2005/0091035 A1 | * | 4/2005 | Kaplan et al. .............. 704/8 |
| 2005/0251519 A1 | * | 11/2005 | Davis ........................ 707/100 |

OTHER PUBLICATIONS

H. Xi and F. Plenning. Dependent Types in Practical Programming. In Proc. of ACM SIGPLAN, pp. 214-227, 1999.

F. Henglein. Efficient Type Inference for Higher-order Binding-time Analysis. In J. Hughes, editor, Functional Programming Languages and Computer Architecture, LNCS 523, Springer-Verlag, 1991. 23 pages.

R. Rodosek, M.G. Wallace, and T. Hajian. A New Approach to Integrate Mixed Integer Programming. CP96 Workshop on Constraint Programming Applications: An Inventory and Taxonomy, 1996. 10 pages.

V. Choppella and C.T. Haynes. Diagnosis of Ill-typed Programs. Technical Report 426, Indiana University, 1995. 10 pages.

B. Demoen, M. Garcia De La Banda, and P.J. Stuckey. Type Constraint Solving for Parametric and Ad-hoc Polymorphism. In Proc. of the 22nd Australian Computer Science Conference, pp. 217-228, 1999.

(Continued)

*Primary Examiner*—Tim T. Vo
*Assistant Examiner*—Mahesh H Dwivedi
(74) *Attorney, Agent, or Firm*—Workman Nydegger (57) ABSTRACT

The subject invention pertains to a system and method of incorporating collation information into data types. In particular, the subject invention provides for parameterizing data types with collation information such that a comparison between two different collations generates a static-type error rather than a run-time error. Additionally, the invention affords for conveniently working with localized data types to allow generic parameterization over collations as well as ordinary types. In the context of strings, the present invention enables concurrent use of strings in multiple languages and facilitates the correct handling thereof.

17 Claims, 11 Drawing Sheets

OTHER PUBLICATIONS

European Search Report for European Application No. EP05107711 dated Aug. 10, 2007. 3 pgs.

Claire Ho, et al. Multilingual Collation and CJG Sorts in Oracle 9i. International Unicode Conference, Apr. 24, 2001, pp. 1-29.

W.D. Rose, et al. Language Independent Interfaces for Culturally Sensitive Collation Functions. IBM Technical Disclosure Bulletin, IBM Corp., New York, US. vol. 37, No. 9. Sep. 1, 1994. pp. 475-476.

* cited by examiner

DATA TYPES WITH INCORPORATED COLLATION INFORMATION

TECHNICAL FIELD

The present invention relates generally to computers and more particularly toward computer programming languages and type systems.

BACKGROUND

Computer software utilization worldwide has increased considerably in recent years. Computer software is employed by individual users for such tasks as word processing and electronic mail, among other things. Companies utilize software for all aspects of business management including data storage, communication, and electronic commerce. Essentially, computer software has become ubiquitous. Accordingly, software developers and vendors need to design software for a diverse customer base, which is essentially the world. Thus, designers can no longer make broad assumptions concerning the use of their system, for example, an English-speaking user in United States. Rather, they must internationalize their software. As part of such internationalization, developers should concern themselves with properties of users of their systems such as language and location.

The world's software consumers are not fluent in a single language but rather are multilingual. Accordingly, software consumers can speak and interact in hundreds of different languages. Furthermore, individual users may be multilingual and feel more comfortable utilizing one language rather than another. Thus, software must be easily operable and functional in a myriad of disparate languages. One current software problem, produced at least by the use of multiple languages, concerns collation.

Collation generally concerns the comparison and ordering of data. In fact, collation is a fundamental aspect of computing. For example, users will likely need to locate strings, compare strings, and sort database records. The problem is that collation is not uniform. It varies by, among other things, language, culture, usage and customs. For example, in Swedish z<ö and in German ö>z. Handling of strings is further complicated by the fact that the same letter can be represented in different ways. For instance, the letter é can be represented either as a single character or as the combination of the underlying character "e" and the accent. Similarly, a single letter can be represented by different characters, for example the letter "β" might be written as "ss" in German. Improper handling of internationalized strings can lead, to among other things, subtle security bugs such as the infamous Turkish I problem, where the FILE:// prefix in a URL is trying to be located utilizing the test "if(url.ToUpper( ).Left(4) =="FILE")." In this test, prior to comparing a string the string is converted to uppercase. However, converting "file" to uppercase in Turkish yields "FİLE" and hence the test fails unexpectedly.

A further matter of concern for internationalization of software includes time. When a program contains a date and time, one needs to know in which time zone such date should be interpreted. If a program indicates that a meeting has been set or a television show will start at 3 p.m., no one knows for sure what time 3 p.m. is without the specification of a time zone. As per the meeting request, some could interpret the time to be in the time zone in which they are located, while others could view the time as the time zone of the meeting requester. With respect to television, it would be confusing as to whether the time specified relates to the time zone of the viewer or Eastern Standard Time because that it the way shows are customarily listed. Moreover, writing and understanding time collation in software programs would be nearly impossible without specification of the time and respective time zone.

Conventional technologies have addressed collation in many different and problematic manners. For example, some database systems support collation per column. In other words, collation data could be attached to entries of a particular column. For instance, one could have a name collation in English and German. However, a single column could not contain both English and German stings. Thus, if a database user had customers from several countries they must put them in separate tables. Moreover, database languages are weakly typed languages, which are problematic for producing safe and reliable software. Another way conventional technologies provide collation is per thread. Here, collation information is specified at a global level. Hence, in order to interpret the comparison $String_1 > String_2$ attention is paid to the global declaration. However, this system is not only weakly typed but it only allows use of a single language at a time. Yet another way collation is handled by conventional systems is via instance. In essence, each instance must carry around collation information. For example:

SqlString s1=new SqlString("llegar", Spanish);
    SqlString s2=new SqlString("lugar", English);
    Int r=s1.CompareTo(s2);

Here, s1 is a Spanish string and s2 is an English string. This technique is disadvantageous at least because it is expensive to carry around additional information for each instance. Moreover, although this comparison would pass at compile time because the types are the same (namely a string), it would fail at runtime because a Spanish string cannot be compared to an English string. Thus, this methodology is also weakly typed and not suited for production of safe and reliable software.

Accordingly, there is a need in the art for an efficient and strongly typed system and method of collation information specification and utilization.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described, the present invention concerns a data constraint construction system and method. The constraint system includes a type constraint and a collation constraint. According to one aspect of the invention, the collation constraint can be incorporated into the data type constraint thereby enabling strong type checking. For instance, the data type can be parameterized with collation information in the form data type<collation information>.

According to one aspect of the present invention, the data type can be a local string and the collation information can designate the language of the string, for example, string<eng>. Furthermore, collation information can be hierarchical to support subtyping. For instance, a collation constraint can include both a language constraint and a culture constraint, and the culture constraint can be utilized to define subtypes of the collation constraint such English-US, English-BR, or English-AU.

The data type could also be datetime, among other things, where datetime provides temporal data. In such a scenario, the collation constraint can be a time zone, as times cannot be compared without knowledge of the time zone associated with each time.

According to another aspect of the subject invention, data constraint components including collation constraints can be used in conjunction with generic types to produce constructed types or further limit the type of data utilized thereby. For example, List<T> can become List<String<eng>>.

Furthermore, in accordance with yet another aspect of the present invention, the subject data constraint construction system and method can be employed to map weakly typed languages (e.g., SQL) to strongly typed languages or systems (e.g., C#, Java, CLR (system with runtime type system)).

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
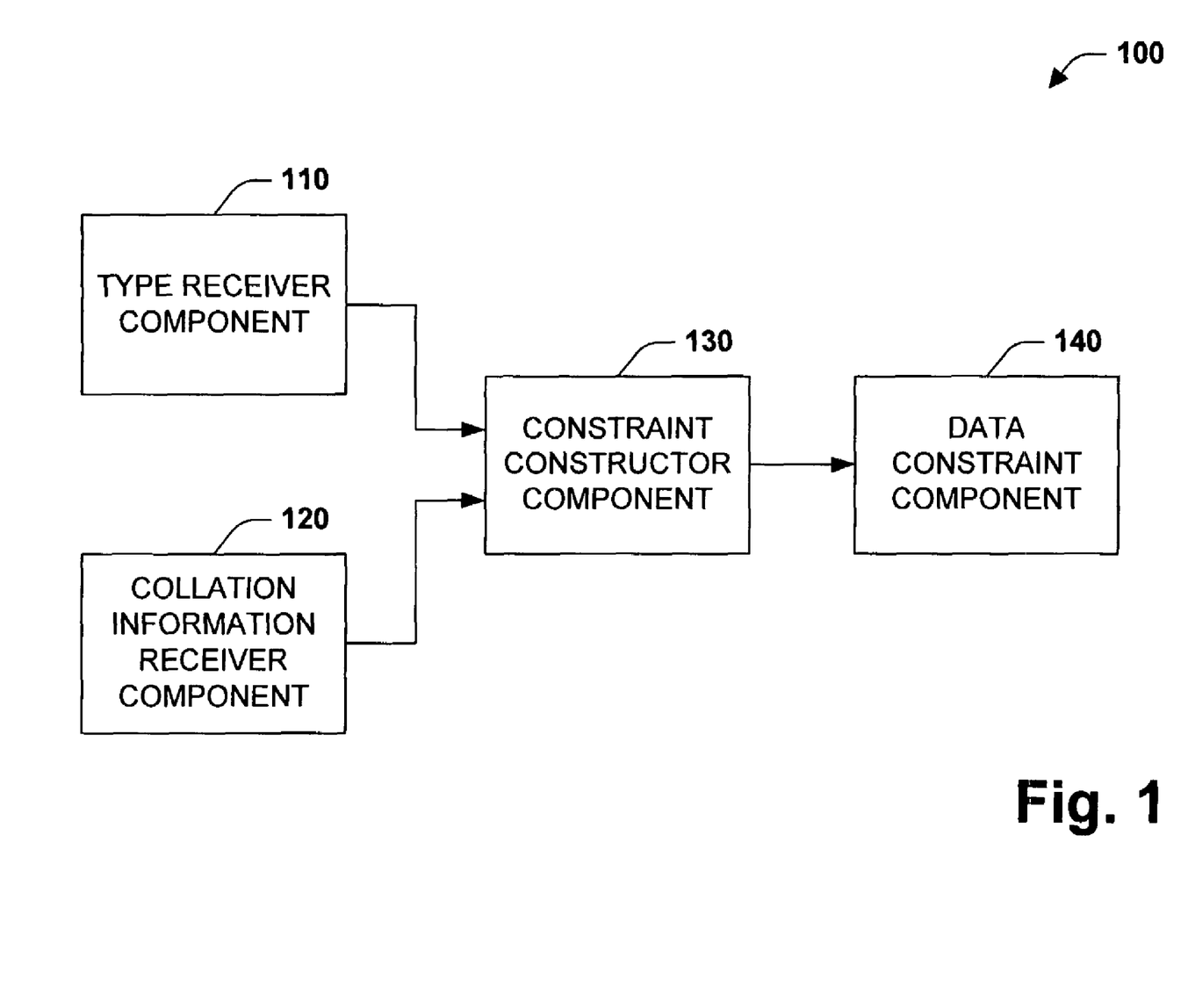
FIG. 1 is a block diagram of a data constraint construction system in accordance with an aspect of the subject invention.

Turning initially to FIG. 1, a data constraint construction system 100 is depicted in accordance with an aspect of the subject invention. Construction system 100 includes type receiver component 110, a collation information receiver component 120, constraint constructor component 130, and data constraint component 140. System 100 can be utilized according to one aspect of the invention as a mechanism for mapping from a weakly typed programming system and language to a strongly typed system and language, for example from a database language (e.g., SQL, XML) to XQuery, C#, or Java to name but a few. Furthermore, construction system 100 can be employed by a programmer to write a code from scratch or with aid (e.g., macros). Type receiver component 110 receives or retrieves a data type including common data types such as strings as well as customized types such as datetime. Collation receiver component 120 receives or retrieves collation information such as language or time zone. In general, collation information is any information that is required to compare data correctly. As described above, type receiver component 110 and collation receiver 120 can receive data from a weakly typed language, a designer, or a program, for example. Constraint constructor component 130 receives type and collation information from the type receiver component 110 and the collation receiver component 120 and generates a data constraint component 140.

Figure 2:
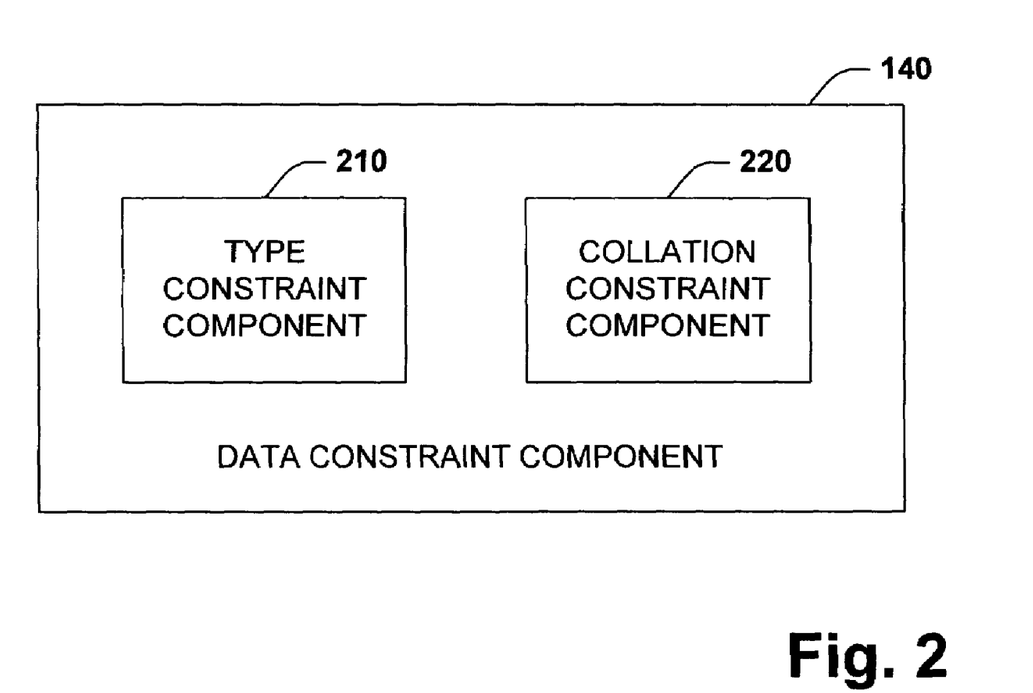
FIG. 2 is a block diagram of a data constraint component in accordance with an aspect of the subject invention.

FIG. 2 illustrates a data constraint component 140 in accordance with an aspect of the present invention. As shown, data constraint component 140 can include a type constraint component 210 and a collation constraint component 220. Data constraint component 140 acts as a mechanism for restraining data associated therewith. Type constraint component 210 provides a restraint on the type of data. Collation constraint component 220 provides a further constraint on the kind of data. Although illustrated separately, it should be appreciated that the data constraint component 140 can represent a data type with collation information incorporated therein. Data constraint component 140 has been illustrated as such solely to emphasis that the data constraint of the invention can include both a restraint on the type and kind of data associated with the constraint component 140 and not to limit the invention in any manner. According to a particular aspect of the subject invention, data types can be parameterized with collation constraints or information. For example, the data constraint component could be represented by the following: DataType<Collation Constraint>. Hence, the subject invention can generate compile time or static errors rather than runtime or dynamic errors produced by conventional technologies. By way of example, assume that the data type constraint is a string and the collation constraint is a language. Further assume that we are concerned the following two strings:

String<English>s1;
String<German>s2;

Here, s1 and s2, data place holders (i.e., variables), must be an English string and a German string, respectively, in accordance with the specified constraints. Now, if we try to compare s1 to s2, a static error will be produced by the compiler. The compile time error will result because the compiler and specifically the type checker will recognize that strings with different collations cannot be compared. Thus, comparison between types becomes a static error instead of a runtime error by incorporating collation information into the type rather than the instance. This is important in the generation of reliable software. Errors or bugs are easier to fix the earlier they are detected. Thus, developers would rather generate compile-time errors that they can fix than to release software that produces run-time errors for consumers.

Figure 3:
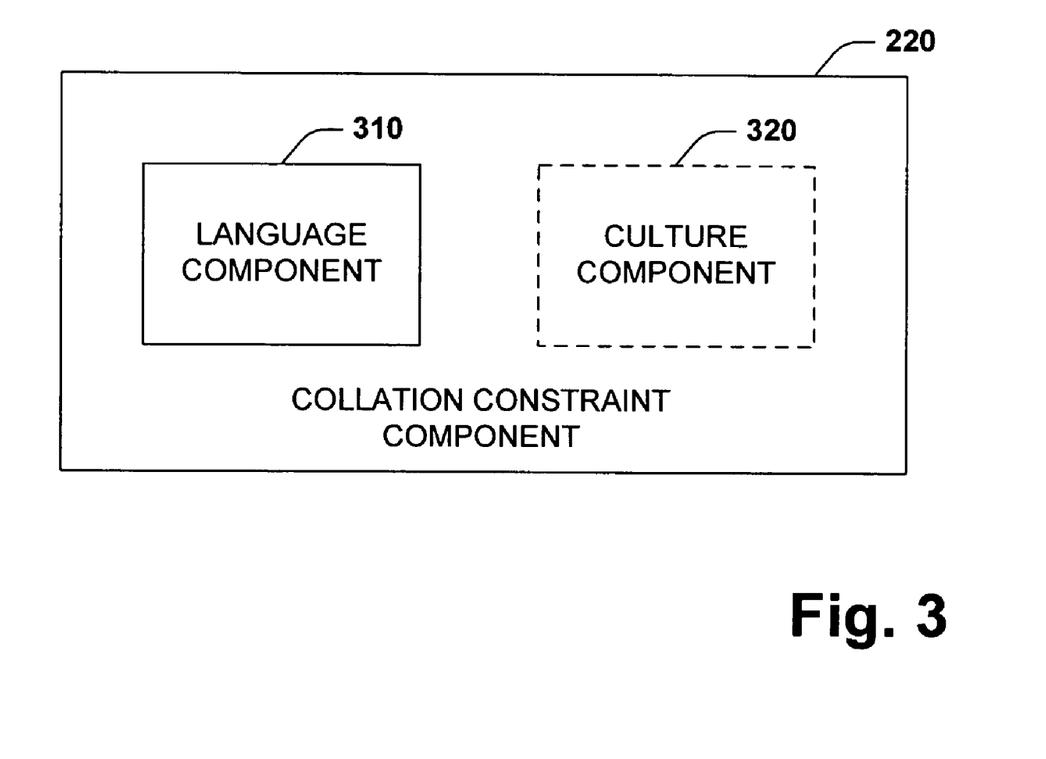
FIG. 3 is a block diagram of a collation constraint component in accordance with an aspect of the present invention.

FIG. 3 illustrates a collation constraint component 220 in accordance with an aspect of the present invention. Collation constraint component 220 includes a language constraint component 310 and a culture constraint component 320. As discussed above, it is important to know the language of a string so that strings can be compared correctly with strings of the same language. Without such knowledge, unexpected errors and security bugs can occur. Accordingly, language constraint component 310 specifies the language associated with data or a variable data placeholder (e.g., English, Russian, German, French, Chinese . . . ). However, language alone often does not provide sufficient information to compare strings correctly. Sometimes language specifics will vary by culture. For instance, United States English can be different from British English which can be different from Australian or South African English. Accordingly, the present invention provides an additional level of language granularity to allow specification of language culture, for instance string<English-US> or string<English-GB>. However, it should be appreciated that the culture constraint may be optional as a general declaration of language may be sufficient for comparison. Thus, the culture constrain component 320 is depicted with dashed lines to indicate that it can be an addition collation constraint but is not required. Furthermore, it should be appreciated that collation constraints can be hierarchical.

Figure 4:
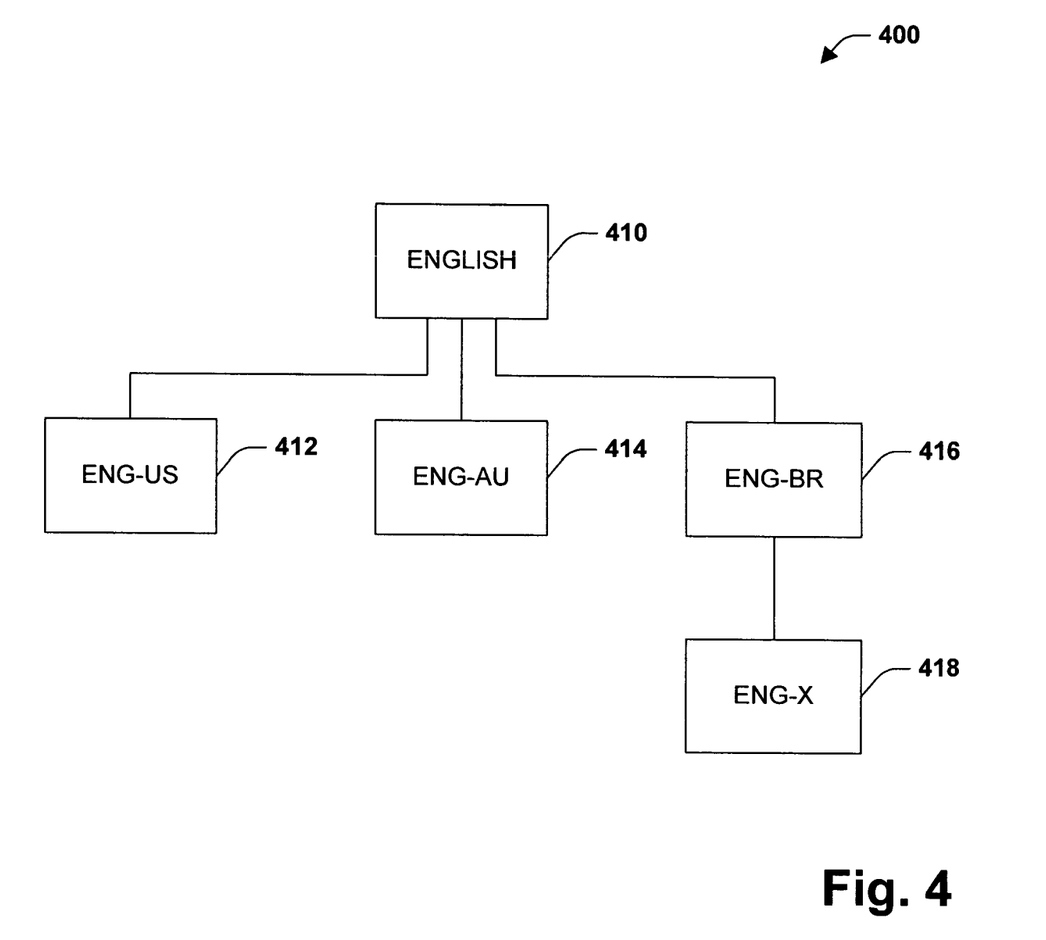
FIG. 4 is a block diagram of a collation constraint hierarchy in accordance with an aspect of the subject invention.

Turing briefly to FIG. 4, an exemplary collation constraint hierarchy 400 is illustrated in accordance with an aspect of the present invention. In particular, the exemplary collation constraint hierarchy 400 concerns language constraints. Here, the parent node 410 is simply English. The children include United States English (eng-us) 412, Australian English (eng-au) 414, and British English (eng-br) 416. Furthermore, British English node 416 has a child of its own representing a dialect of British English (eng-x) 418. Accordingly, data types such as strings can satisfy subtype relationships. Thus, string<eng-x> is compatible with string<eng> because eng-x is a subtype or sublanguage of eng. In other words, eng-x is comparable to generic English. However, string<eng-us> and string<eng-au> or string<eng-br> are not compatible or comparable in this example.

To conveniently work with data types such as localized strings, the present invention provides for generic parameterization over collation as well as ordinary types. Conventionally, generics have only been implemented to allow parameterization over types. For example, consider the following collection:

class Collection<A>{void Add (A a) { . . . } A Item(int i) { . . . }}

This type can be instantiated to collections of arbitrary types such as Collection<int> or Collection<Collection<bool { }>>. According to an aspect of the present invention, data types are parameterized over collations; however, the subject invention also enables definition of generized methods such as:

static Collection<String<C>>Sort<C> (Collection<String<C>ss>){ . . . }

It should be noted that the generic parameter of the Sort method is a collation, not a type. Similarly, the present invention provides for constraints over collations as well as over types. Hence, sorting can be restricted to particular language strings, for example, by simply declaring:

static Collection<String<C>>Sort<C>where C: eng (Collection<String<C>) { . . . }

Here, collection is limited to English strings and consequently the sort method sorts only English strings.

Figure 5:
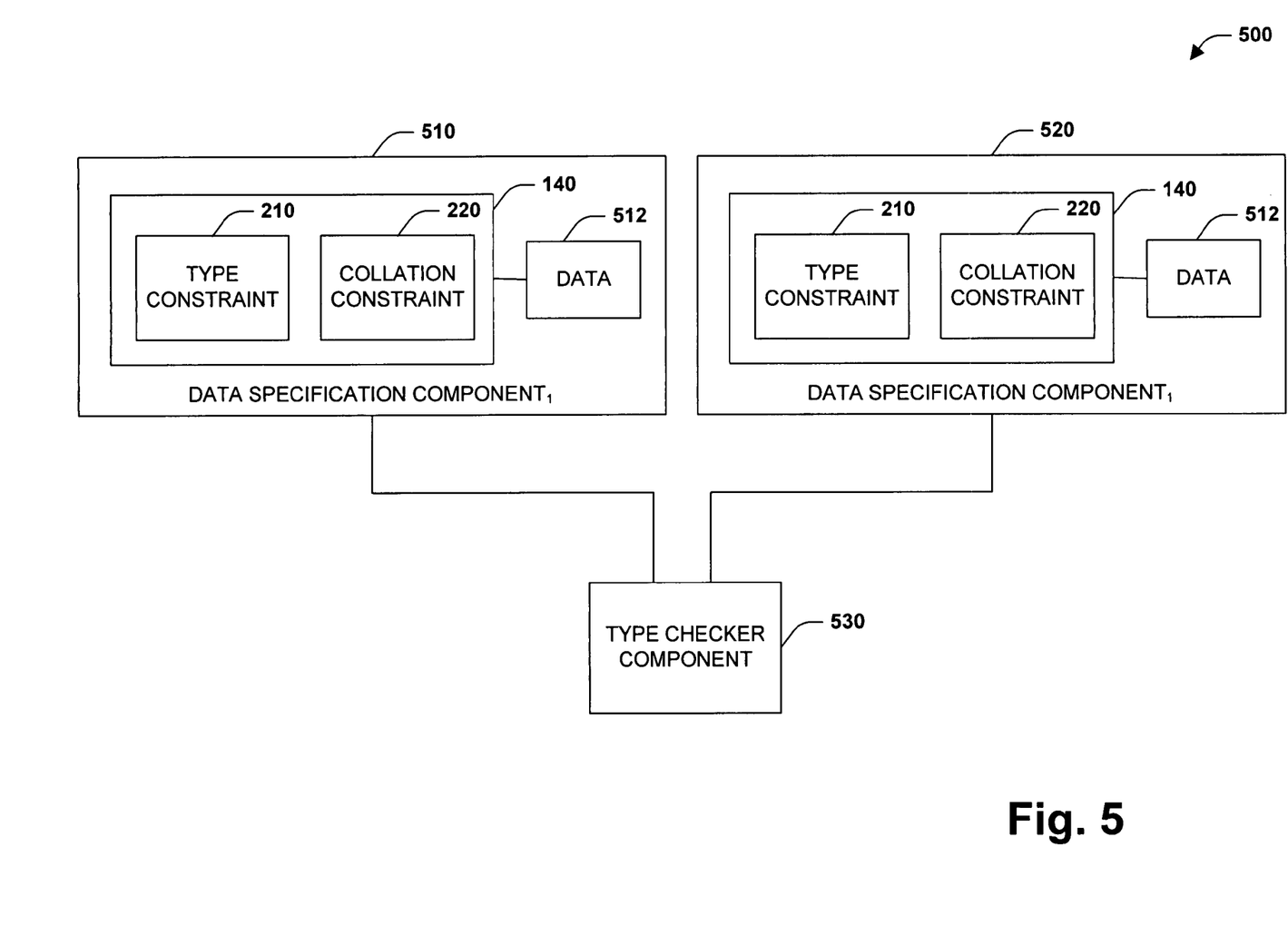
FIG. 5 is a block diagram of a type check system in accordance with an aspect of the subject invention.

FIG. 5 illustrates a type check system 500 in accordance with an aspect of the subject invention. The system 500 includes two data specification components 510 and 520 as well as a type checker component 530. Each data specification component includes a data constraint component 140 and data 512. The constraint component 140 includes a type constraint component 210 and a collation constraint component 220. Thus, the constraint component 140 restricts the type and kind of data 512. Type checker component 530 analyzes both data specification components 510 and 520 to ensure that the data constraints of are met and that the components are compatible. If either or both tests fail the type checker can produce a compile-time error. For example, type checker component 530 can first analyze data specification component 510 by determining the type and kind of data and comparing it to the constraints 210 and 220, respectively, of the constrain component 140. The type checker then performs the same test on data specification component 520. Subsequently, the data constraint components can be compared to determine compatibility. Specifically, the data type constraint components 210 can be compared to ensure the types are the same or compatible. Similarly, collation constraint components can be compared to ascertain whether the collations are the same or comparable. If any or all tests fail, a compile-time error can be generated by type checker component 530.

Figure 6:
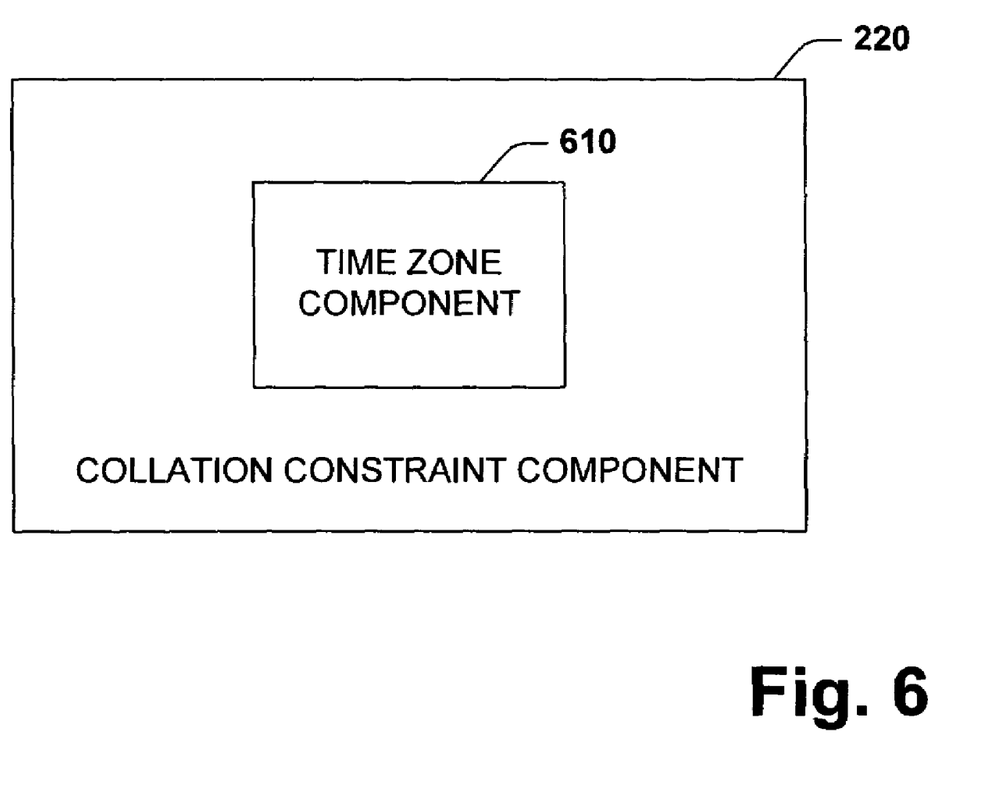
FIG. 6 is a block diagram of a collation restraint component in accordance with an aspect of the present invention.

Thus far, collation has been discussed primarily in relation to strings and language information. However, it should be appreciated that the collation constraints of the present invention are not so limited. For instance, FIG. 6 illustrates a collation constraint component 220 in accordance with an aspect of the present invention. Collation constraint component 220 includes a time zone component 610. Time zone component 610 can be utilized to constrain a type such as datetime. Datetime can represent the date and/or time relative to a calendar. However, datetime comparisons are only meaningful if instances are in the same time zone. Accordingly, the time zone component 610 can parameterize a type such as datetime in the form Datetime<Time Zone>.

It should be appreciated that collation is not new a new concept. However, the subject invention provides a novel and nonobvious system and method (described in more detail infra) of specification and utilization of collation information. For example, in conventional generics, types are parameterized solely with other types. The present invention, however, introduces types that are parameterized with collation data. Furthermore, the subject invention identifies and overcomes a conventional misconception regarding collation information. In particular, when thinking about collation, those of skill in the art have a common misconception that collation is merely a property of a user who reads or utilizes data. Accordingly, conventional systems have been designed to define collation information globally as part of the user environment, per thread, or per instance. To the contrary, the subject invention views collation as a property of data itself in stark contrast to the conventional understanding.

Figure 7:
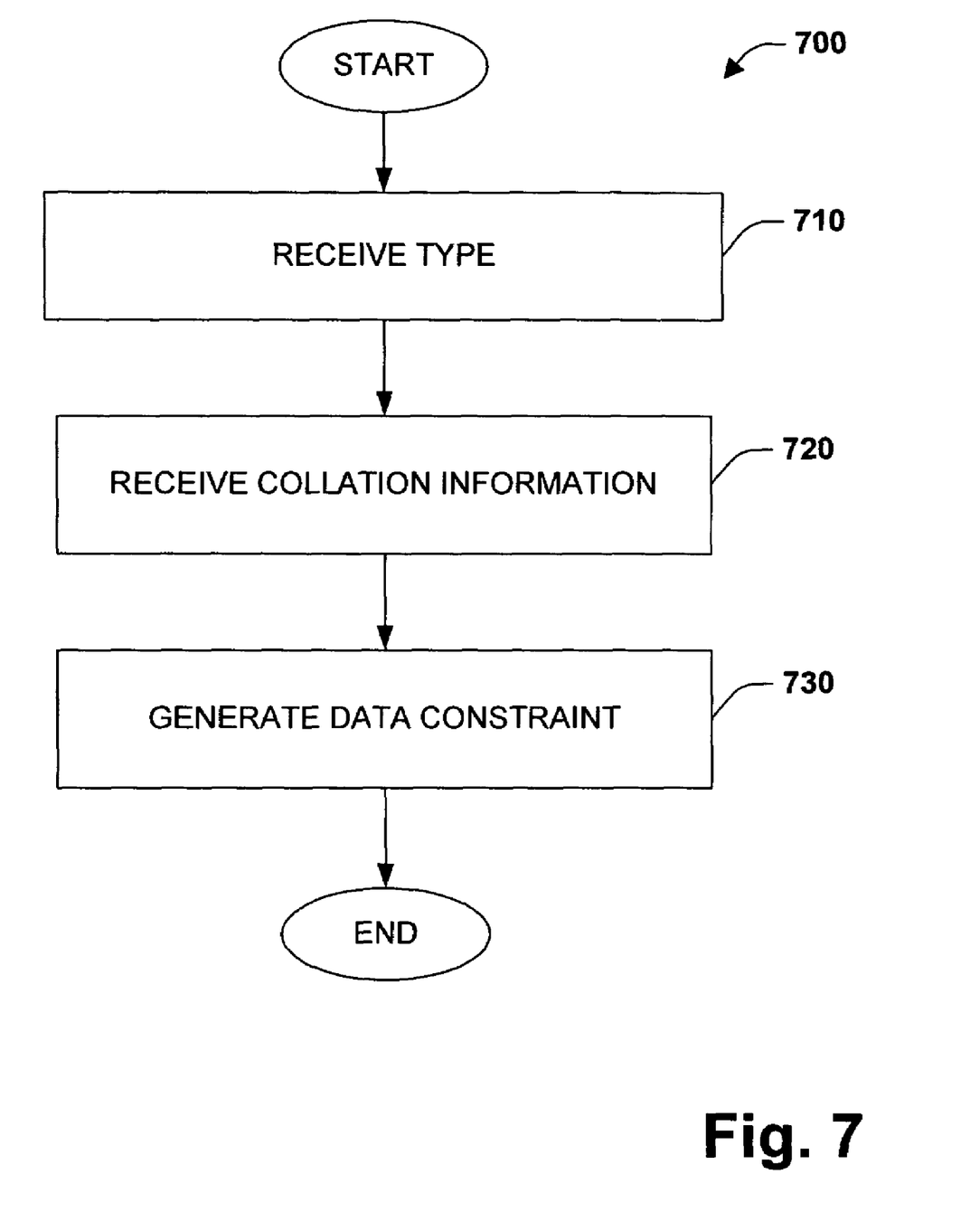
FIG. 7 is flow chart diagram of a data constraint methodology in accordance with an aspect of the subject invention.
Figure 8:
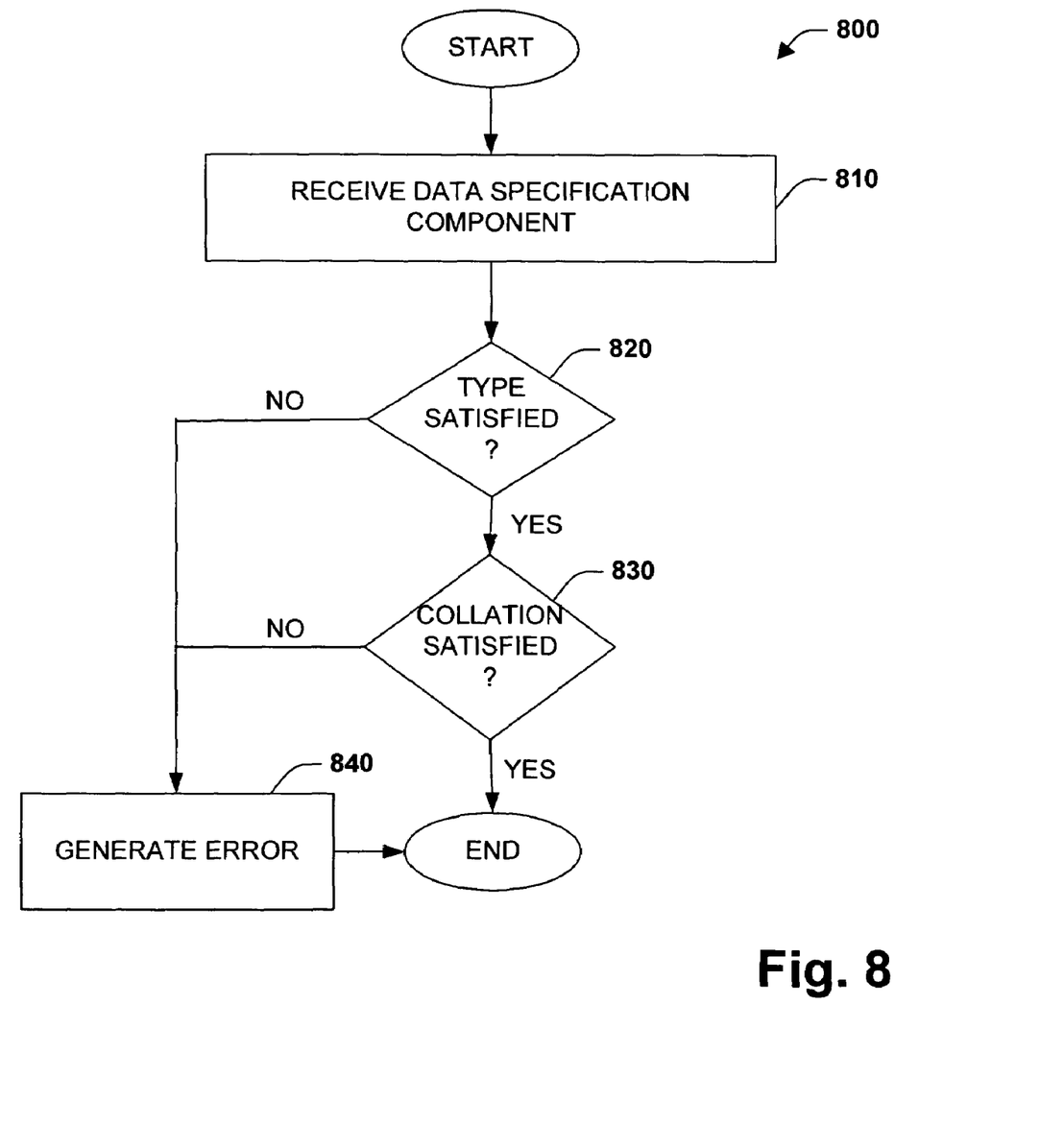
FIG. 8 is a flow chart diagram of a type checking methodology in accordance with an aspect of the present invention.
Figure 9:
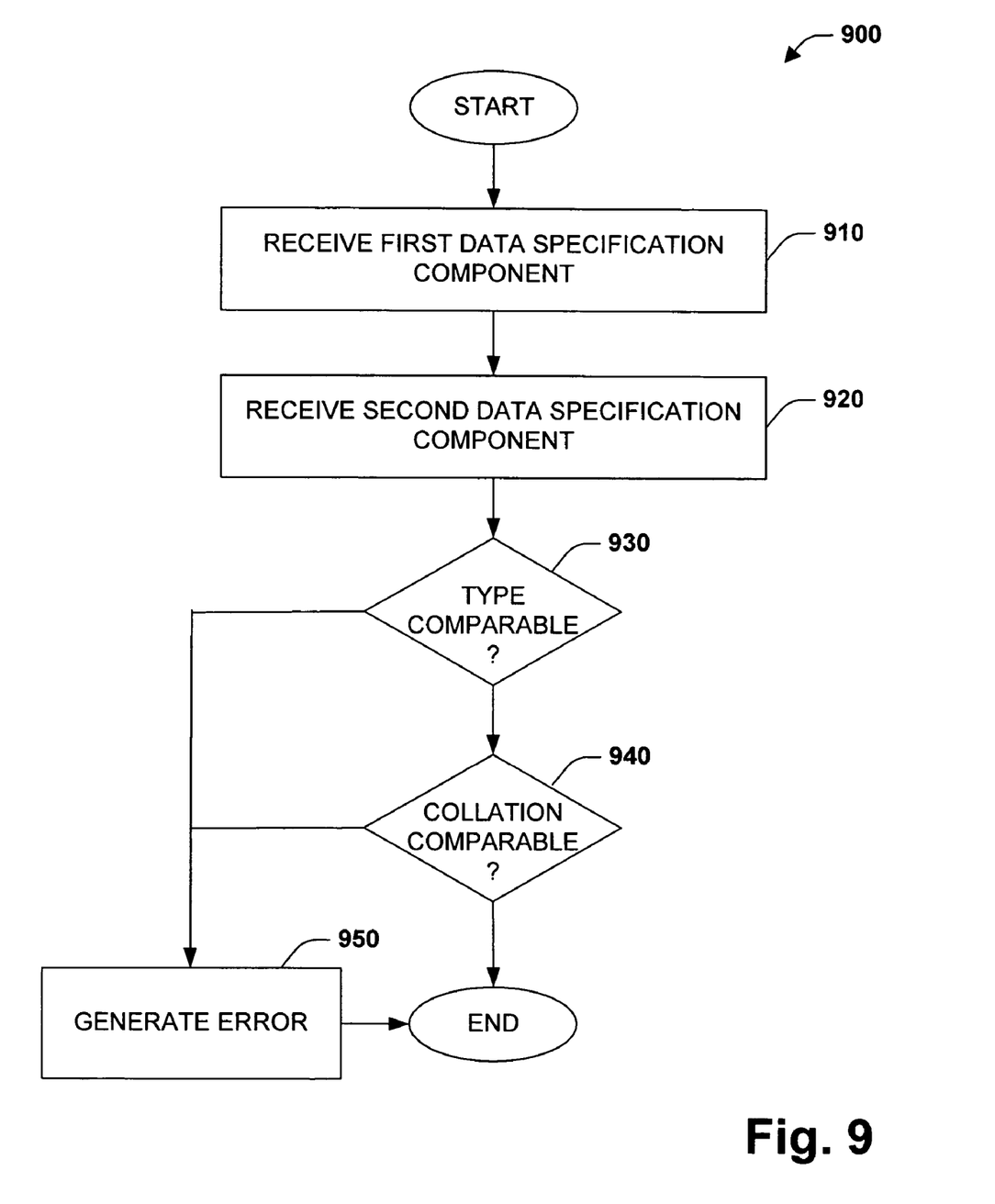
FIG. 9 is a flow chart diagram of a type checking methodology in accordance with an aspect of the subject invention.

In view of the exemplary systems described supra, a methodology that may be implemented in accordance with the present invention will be better appreciated with reference to the flow charts of FIGS. 7-9. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Turning to FIG. 7, a data constraint methodology 700 is illustrated in accordance with an aspect of the subject invention. At 710, a data type is received. A data type can be a common type such as string or a custom type such as datetime. At 720, collation information is received. Collation information includes data generally necessary to compare and/or order data. For example, the language of string text is required to correctly compare two strings and time zone is necessary to compare two times. The data type and collation information are received by a constructor component and a data constraint is generated at 730. A data constraint restricts the types and kinds of data associated therewith. According to one aspect of the subject invention, the data constraint can correspond to a data type incorporating collation information. For example, the data constraint can be a data type parameterized by collation information such as data type<language> or more specifically string<English>. It should also be appreciated that the subject constraint methodology can be utilized to facilitate mapping between weakly typed languages (e.g., SQL) to strongly typed languages (e.g., C#, Java . . . ), where the types and constraints are received from a weakly typed language.

Additionally, it should be noted that generated data constraints can be utilized in conjunction with generic types. Generic types such as Array<T> are data types whose types T are determined upon instantiation. Thus, Array<T> could be a list of strings, a list of integers a list of records, etc. A generic type with a fixed type such as Array<Int> is called a constructed type. According to an aspect of the invention, collation information and data constraints can be employed together with generic types to produce a constructed type or further constrain the types or data that can be utilized. For example:

```
Sortable Array <T>
    Where T : String<C>
        C : eng {
    }
```

Here, T is a string of some collation C and the collation must be English. In this example, an array of English strings can be sorted.

FIG. 8 depicts a type check methodology 800 in accordance with an aspect of the present invention. At 810, a data specification component is received. The data specification component includes data constraint component comprising a type constraint and a collation constraint and data or a variable placeholder. At 820, a determination is made concerning whether the data is of the type specified by the type constraint. For instance, is the data of type string as specified? If the data is not of the same type as the data constraint, then the process proceeds at 840 where an error is generated. If the types are the same, the process proceeds at 830, where a determination is made as to whether the data meets the collation constraint. For example, is the string an English string as required? If the collation constraint is satisfied, the process terminates. If the collation constraint is not satisfied, the process proceeds at 840 where an error is generated. Subsequently, the process is terminated.

FIG. 9 is another type check methodology 900 in accordance with an aspect of the subject invention. Once individual data specification components are type checked a comparison therebetween can be checked. At 910, a first specification component is received. A second specification component is received at 920. At 930, the types of each specification component are examined to determine if the are the same or comparable. For example, a string and a string are comparable, while a string an integer is not. If the types are not comparable, the method proceeds to 950 where an error is generated. If the types are the same or comparable the process proceeds to 940 where a determination is made as to whether the collation constraints are comparable. For instance, an English string is not comparable to a German string whilst an English string is comparable to another English string. Furthermore, in the case of language defining the collation there may be subtype relations that may be comparable, for instance the generic English with British English (e.g., eng to eng-br). If the collation information is comparable, the method terminates without error. If, however, the collation information is incompatible or not comparable, an error is generated at 950 and the method terminates.

Figure 10:
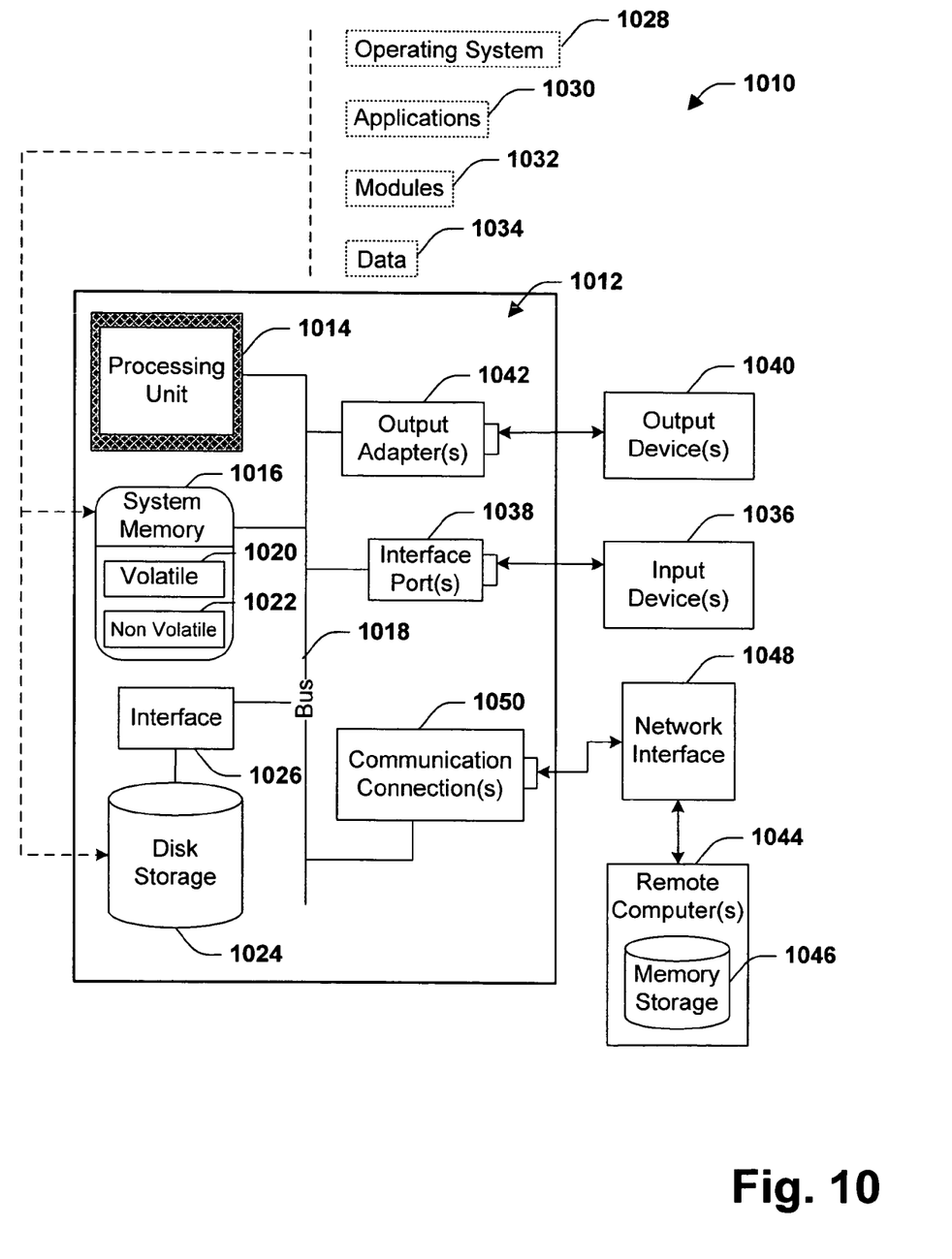
FIG. 10 is a schematic block diagram illustrating a suitable operating environment in accordance with an aspect of the present invention.
Figure 11:
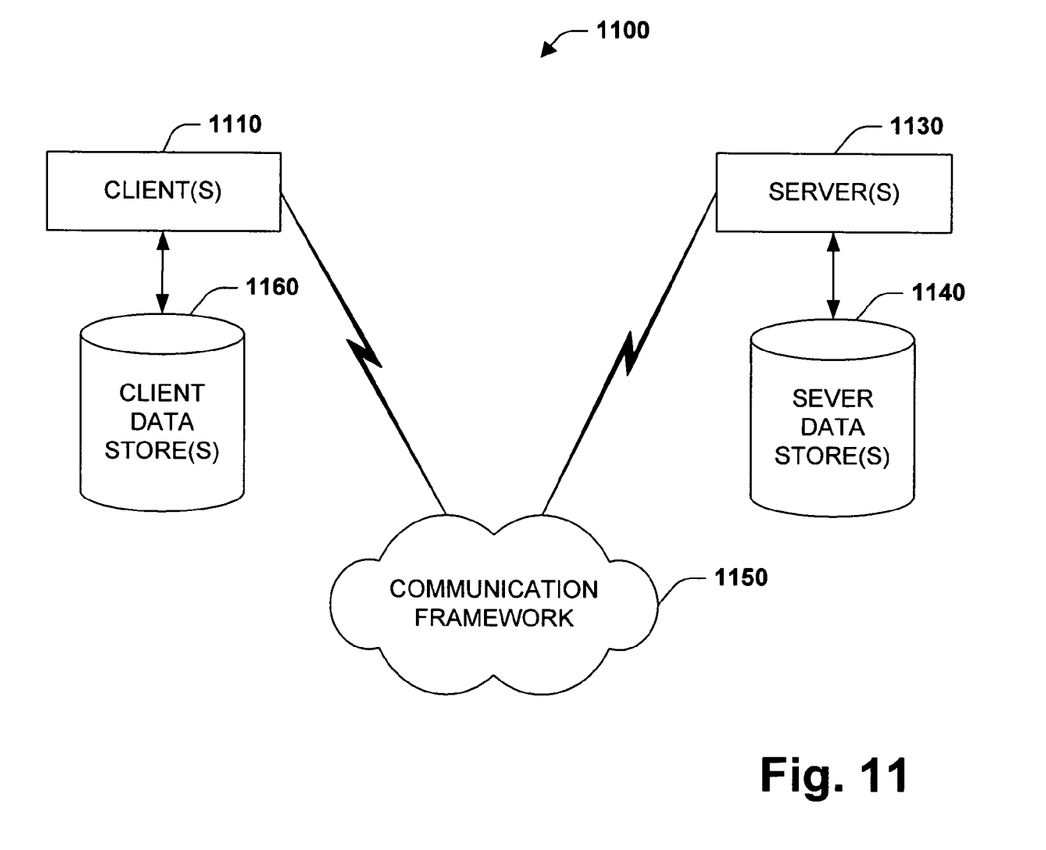
FIG. 11 is a schematic block diagram of a sample-computing environment with which the present invention can interact.

In order to provide a context for the various aspects of the invention, FIGS. 10 and 11 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example disk storage 1024. Disk storage 4124 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel and CRT), speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems, power modems and DSL modems, ISDN adapters, and Ethernet cards.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data constraint system comprising a processor executing the following components:
   a type receiver component that receives a data type;
   a collation information receiver component that receives collation information used to compare and/or order data of the received data type, the collation information comprising one or more additional data type parameters that are configured to facilitate compile-time strong type checking of the data type, wherein during a compare or order operation, the compile-time analysis ensures that the data types, including any additional data type parameters, are the same or compatible;
   a construction component that utilizes the received type and the collation information to produce a data constraint component that includes a type restraint and a collation restraint which includes the additional data type parameters such that variables of the received data type parameterized by the collation information automatically include the collation information, wherein parameterizing includes adding one or more additional data type parameters to the data type, and further wherein the additional type parameters allow for strong type checking at compile-time without having to carry additional information associated with collation for each instance of the data.

2. The system of claim 1, wherein the data constraint component is employed in conjunction with generic types to create a constructed type.

3. The system of claim 1, wherein the collation restraint is hierarchical to support collation subtype relationships.

4. The system of claim 1, wherein the collation restraint includes a language constraint component.

5. The system of claim 4, wherein the collation restraint includes a culture restraint component.

6. The system of claim 1, wherein the collation restraint includes a time zone.

7. The system of claim 1, wherein the data constraint component is a parameterized type.

8. The system of claim 1, wherein the data type is a string and the collation information is language.

9. The system of claim 1, wherein the data type relates to time and the collation information is time zone.

10. The system of claim 1, wherein the type and collation information are received from a weakly typed program.

11. A method for generating a data constraint, comprising:
    receiving a data type, wherein the data type is either a string where the collation information is language or datetime where the collation information is time zone;
    receiving collation information used to compare and/or order data of the received data type, the collation information comprising one or more additional data type parameters that are configured to facilitate compile-time strong type checking of the data type, wherein during a compare or order operation, the compile-time analysis ensures that the data types, including any additional data type parameters, are the same or compatible;
    generating a data constraint that is parameterized with the collation information that relates to comparison of data of the received data type, wherein parameterizing includes adding one or more additional data type parameters to the data type, and further wherein the additional type parameters allow for strong type checking at compile-time without having to carry additional information associated with collation for each instance of the data.

12. The method of claim 11, wherein the collation information includes cultural data specifying a language subtype.

13. The method of claim 11, further comprising producing a constructed type utilizing the generated data constraint as a generic type parameter.

14. A method of mapping between programming languages or systems comprising:
    receiving a data type and collation information of data related to the received data type from a weakly typed language or system, the data type comprising either a string where the collation information is language or datetime where the collation information is time zone, the collation information comprising one or more additional data type parameters that are configured to facilitate compile-time strong type checking of the data type, wherein during a compare or order operation, the compile-time analysis ensures that the data types, including any additional data type parameters, are the same or compatible; and
    generating a data constraint component, the data constraint component including the data type parameterized by the collation information, wherein parameterizing includes adding one or more additional data type parameters to the data type, and further wherein the additional type parameters allow for strong type checking at compile-time without having to carry additional information associated with collation for each instance of the data.

15. The method of claim 14, wherein the data type and collation information are received from a database and are mapped to a strongly typed programming language utilizing the data constraint component.

16. The method of claim 15, wherein the strongly typed programming language includes one of C#, Java, and Xquery.

17. The method of claim 16, wherein the mapping provides for multilingual systems that support more than one language on the system at the same time.

* * * * *